United States Patent
Poulsen

(10) Patent No.: US 10,007,637 B2
(45) Date of Patent: Jun. 26, 2018

(54) SINGLE WIRE BUS SYSTEM

(71) Applicant: BlackBerry Limited, Waterloo (CA)

(72) Inventor: Jens Kristian Poulsen, Kitchener (CA)

(73) Assignee: BlackBerry Limited, Waterloo, ON (CA)

( * ) Notice: Subject to any disclaimer, the term of this patent is extended or adjusted under 35 U.S.C. 154(b) by 596 days.

(21) Appl. No.: 14/311,468

(22) Filed: Jun. 23, 2014

(65) Prior Publication Data

US 2014/0304443 A1    Oct. 9, 2014

Related U.S. Application Data

(63) Continuation of application No. 12/958,942, filed on Dec. 2, 2010, now Pat. No. 8,775,707.

(51) Int. Cl.
    *G06F 13/42* (2006.01)

(52) U.S. Cl.
    CPC ........ *G06F 13/423* (2013.01); *G06F 13/4291* (2013.01); *G06F 13/4295* (2013.01)

(58) Field of Classification Search
    CPC ..... G06F 13/42; G06F 13/4291; G06F 13/423
    See application file for complete search history.

(56) References Cited

U.S. PATENT DOCUMENTS

| | | | |
|---|---|---|---|
| 3,710,262 A | 1/1973 | Sorensen | |
| 3,810,111 A | 5/1974 | Patel | |
| 3,883,729 A | 5/1975 | de Cremiers | |
| 3,995,264 A | 11/1976 | Ouchi | |
| 4,321,483 A | 3/1982 | Dugan | |
| 4,530,088 A | 7/1985 | Hamstra et al. | |
| 4,592,077 A | 5/1986 | Norton | |
| 4,701,939 A * | 10/1987 | Stutt | H04L 7/042 375/366 |
| 4,817,117 A | 3/1989 | Tasto et al. | |

(Continued)

FOREIGN PATENT DOCUMENTS

| | | |
|---|---|---|
| CA | 2759946 A1 | 6/2012 |
| CN | 101336561 B | 12/2008 |

(Continued)

OTHER PUBLICATIONS

Document relating to CN Application No. 201110404887.7, dated Jun. 4, 2014 (English Translation of 2nd Office Action).

(Continued)

*Primary Examiner* — Tim T Vo
*Assistant Examiner* — Phong H Dang
(74) *Attorney, Agent, or Firm* — Integral IP; Miriam Paton; Amy Scouten

(57) ABSTRACT

There is provided a single wire bus architecture comprising a single wire bus; a master device coupled to the single wire bus; at least one slave device coupled to the single wire bus; a communication protocol implemented over the single wire bus and employed by the master device and the at least one slave device; wherein when one of the at least one slave devices wishes to communicate with the master device, the one of the at least one slave devices discharges the clock signal during a tri-state stage of the clock signal; and wherein the single wire bus transmits a clock signal, power and data between the master device and the one of the at least one slave device in communication with the master device.

16 Claims, 16 Drawing Sheets

(56) References Cited

U.S. PATENT DOCUMENTS

| | | | |
|---|---|---|---|
| 4,907,222 | A | 3/1990 | Slavik |
| 5,012,240 | A | 4/1991 | Takahashi et al. |
| 5,060,227 | A | 10/1991 | Finley et al. |
| 5,210,846 | A | 5/1993 | Lee |
| 5,237,322 | A | 8/1993 | Heberle |
| 5,297,181 | A | 3/1994 | Barr et al. |
| 5,349,611 | A * | 9/1994 | Varian .................. H04L 7/043 370/515 |
| 5,398,326 | A | 3/1995 | Lee |
| 5,459,722 | A | 10/1995 | Sherif |
| 5,495,240 | A | 2/1996 | Herbele |
| 5,532,556 | A | 7/1996 | Anderson et al. |
| 5,577,044 | A | 11/1996 | Oxford |
| 5,856,975 | A | 1/1999 | Rostoker et al. |
| 5,862,354 | A | 1/1999 | Curiger et al. |
| 5,864,872 | A | 1/1999 | Lee et al. |
| 5,903,607 | A | 5/1999 | Taillet |
| 6,009,389 | A | 12/1999 | Dokic et al. |
| 6,026,088 | A | 2/2000 | Rostoker et al. |
| 6,108,751 | A | 8/2000 | Lee et al. |
| 6,145,007 | A | 11/2000 | Dokic et al. |
| 6,182,180 | B1 | 1/2001 | Liu et al. |
| 6,205,504 | B1 | 3/2001 | Faust et al. |
| 6,378,101 | B1 * | 4/2002 | Sinha .................. H04L 1/0047 714/755 |
| 6,438,434 | B1 | 8/2002 | Kamiya |
| 6,507,299 | B1 | 1/2003 | Nuitjen |
| 6,532,506 | B1 * | 3/2003 | Dunstan .............. G06F 13/4295 326/86 |
| 6,535,505 | B1 | 3/2003 | Hwang et al. |
| 6,539,443 | B1 | 3/2003 | Dunstan et al. |
| 6,567,780 | B2 | 5/2003 | Rhoads |
| 6,665,750 | B1 * | 12/2003 | Williams .............. G06F 13/385 710/26 |
| 6,697,897 | B1 | 2/2004 | Fried et al. |
| 6,737,957 | B1 | 5/2004 | Petrovic et al. |
| 6,904,110 | B2 | 6/2005 | Trans et al. |
| 6,931,370 | B1 | 8/2005 | McDowell |
| 6,944,298 | B1 | 9/2005 | Rhoads |
| 6,947,893 | B1 | 9/2005 | Iwaki et al. |
| 7,054,280 | B2 | 5/2006 | Novak et al. |
| 7,099,970 | B1 * | 8/2006 | Foegelle ................ G06F 13/38 710/110 |
| 7,181,557 | B1 | 2/2007 | Falik et al. |
| 7,200,782 | B2 | 4/2007 | Vining |
| 7,245,630 | B1 | 7/2007 | Chen et al. |
| 7,292,876 | B2 | 11/2007 | Bosch et al. |
| 7,324,159 | B2 | 1/2008 | Eveleens et al. |
| 7,365,669 | B1 | 4/2008 | Melanson |
| 7,406,100 | B2 | 7/2008 | Rocas et al. |
| 7,519,005 | B2 | 4/2009 | Hejdeman et al. |
| 7,590,070 | B1 | 9/2009 | Asawa et al. |
| 7,606,955 | B1 | 10/2009 | Falik et al. |
| 7,668,202 | B2 | 2/2010 | Gillet |
| 8,103,869 | B2 | 1/2012 | Balandin et al. |
| 8,161,224 | B2 | 4/2012 | Laurencin et al. |
| 8,775,707 | B2 * | 7/2014 | Poulsen .............. G06F 13/423 710/105 |
| 8,874,816 | B2 * | 10/2014 | Tailliet ............... G06F 13/4295 710/110 |
| 2003/0070116 | A1 * | 4/2003 | Adams .............. G01R 31/31937 714/25 |
| 2004/0068535 | A1 | 4/2004 | Subbiah et al. |
| 2004/0116151 | A1 | 6/2004 | Bosch et al. |
| 2004/0233917 | A1 | 11/2004 | Rocas et al. |
| 2004/0250002 | A1 * | 12/2004 | Hellberg ............. G06F 1/1632 710/72 |
| 2005/0049020 | A1 | 3/2005 | Higgins et al. |
| 2005/0259609 | A1 | 11/2005 | Hansquine et al. |
| 2006/0187969 | A1 | 8/2006 | Kadowaki |
| 2007/0121006 | A1 | 5/2007 | Kim |
| 2007/0162665 | A1 | 7/2007 | Lee |
| 2007/0186021 | A1 * | 8/2007 | Drexler ............. G06F 13/4295 710/260 |
| 2007/0232266 | A1 * | 10/2007 | Pinder et al. |
| 2007/0288674 | A1 * | 12/2007 | Ikeno ................. G05B 19/058 710/110 |
| 2008/0163663 | A1 | 7/2008 | Hankey et al. |
| 2008/0181186 | A1 | 7/2008 | Rofougaran |
| 2008/0279320 | A1 | 11/2008 | Rocas et al. |
| 2009/0024235 | A1 | 1/2009 | Kim |
| 2009/0116475 | A1 | 5/2009 | Krzyzanowski et al. |
| 2009/0119439 | A1 | 5/2009 | Zou et al. |
| 2009/0285411 | A1 | 11/2009 | Lung et al. |
| 2009/0302806 | A1 | 12/2009 | Lindlar et al. |
| 2009/0323975 | A1 | 12/2009 | Groesch |
| 2010/0022183 | A1 | 1/2010 | Ryle et al. |
| 2010/0260362 | A1 | 10/2010 | Sander et al. |
| 2010/0315964 | A1 | 12/2010 | Kim et al. |
| 2012/0014530 | A1 | 1/2012 | Yamkovoy |
| 2012/0144078 | A1 | 6/2012 | Poulsen |
| 2012/0203560 | A1 | 8/2012 | Poulsen |
| 2013/0108068 | A1 | 5/2013 | Poulsen |
| 2013/0174208 | A1 | 7/2013 | Lee et al. |
| 2013/0322461 | A1 | 12/2013 | Poulsen |
| 2013/0322462 | A1 | 12/2013 | Poulsen |
| 2014/0247834 | A1 | 9/2014 | Poulsen |

FOREIGN PATENT DOCUMENTS

| | | |
|---|---|---|
| CN | 101336561 B | 7/2012 |
| CN | 102591834 A | 7/2012 |
| EP | 0405968 B1 | 9/1995 |
| EP | 693729 B1 | 1/1996 |
| EP | 693729 B1 | 2/2000 |
| EP | 2466481 A1 | 6/2012 |
| EP | 2775654 A1 | 9/2014 |
| JP | 58095447 | 6/1983 |
| JP | 58101541 | 6/1983 |
| WO | 2004086614 A1 | 10/2004 |
| WO | 2007068500 A1 | 6/2007 |
| WO | 2009045904 | 4/2009 |
| WO | 2010010278 | 1/2010 |
| WO | 2012012309 | 1/2012 |
| WO | 2013177664 A1 | 12/2013 |
| WO | 2013177665 A1 | 12/2013 |

OTHER PUBLICATIONS

Document relating to CN Application No. 201110404887.7, dated Jul. 17, 2014 (Response).
Document relating to CA Application No. 2,759,946, dated Aug. 4, 2014 (Office Action).
Document relating to U.S. Appl. No. 13/020,850, dated Sep. 2, 2014 (Response with Terminal Disclaimer).
Document relating to U.S. Appl. No. 13/020,850, dated Sep. 15, 2014 (Notice of Allowance).
Response. European Patent Application No. 10193567.4, dated Sep. 29, 2014.
Response. European Patent Application No. 10193567.4, dated Nov. 14, 2014.
Provision of the minutes in accordance with Rule 124(4) EPC. European Patent Application No. 10193567.4, dated Dec. 22, 2014.
Decision to refuse a European Patent application. European Patent Application No. 10193567.4, dated Dec. 22, 2014.
Notification of Completion of Formalities for Registration and Notification of Grant of Rights for Invention Patent. Chinese Patent Application No. 201110404887.7, dated Sep. 28, 2014.
Final Office Action. U.S. Appl. No. 13/282,577, dated Sep. 25, 2014.
Petition to Withdraw an Application from Issue after Payment of the Issue Fee under 37 CFR 1.313(c). U.S. Appl. No. 13/020,850, dated Jan. 21, 2015.
Decision on Petition. U.S. Appl. No. 13/020,850, dated Jan. 21, 2015.
Request for Continued Examination (RCE). U.S. Appl. No. 13/020,850, dated Jan. 21, 2015.
Patent Withdrawal Notice. U.S. Appl. No. 13/020,850, dated Jan. 22, 2015.

(56) References Cited

OTHER PUBLICATIONS

Notice of Allowance. U.S. Appl. No. 13/020,850, dated Feb. 3, 2015.
Benjamin W. Wah, Xiao Su and Dong Lin. A Survey of Error-Concealment Schemes for Real-Time Audio and Video Transmissions over the Internet. Department of Electrical and Computer Engineering and the Coordinated Science Laboratory University of Illinois at Urbana-Champaign, Urbana, IL 61801, USA Dec. 2000.
Wen-Tsai Liao, Jeng-Chun Chen and Ming-Syan Chen. Adaptive Recovery Techniques for Real-Time Audio Streams. Electrical Engineering Department National Taiwan University, Taipei, Taiwan, ROC. Apr. 2001.
Prima LT Users Guide—Feature Overview and Model Description. Online at <http://www.musicamusa.com/techdocs/Manual/It/Ituser1.PDF> Available as early as Apr. 2001.
Ghayour, Third Office Action for CA2,759,946, dated Aug. 5, 2015.
Atmel Corporation. AVR318: Dallas 1-Wire master. Application Note. 2004.
Ito T. et al.: "mBIC Code and Its Performance in an Optical Communication System", IEEE Transactions on Communications, IEEE Service Center, Piscataway, NJ, USA, vol. COM-32, No. 2, Feb. 1, 1984, pp. 163-168, XP000758558, ISSN: 0090-6778.
Fairhurst G.: "Manchester Encoding", Internet Citation, Sep. 2001, XP002348542, Retrieved from the Internet: URL: http://www.erg.abdn.ac.uk/users/gorry/course/phy-pages/man.html.[retrieved on Oct. 11, 2005].
Springbok Digitronics. 1-Wire FAQ. Design Guide v1.0. Aug. 19, 2004.
Awtrey, Dan. Transmitting Data and Power over a One-Wire Bus. Feb. 1997.
Maxim Integrated Products, Overview of 1-Wire Technology and Its Use, http://pdfserv.maxim-ic.com/en/an/AN1796.pdf, Jun. 19, 2008.
Downs, "Using 1-Wire I/O for Distributed System Monitoring", The AIAA/IEEE/SAE Digital Avionics Systems Conference Proceedings, Sep. 15, 1998, pp. 161-168, XP010305393.
Hi-Mobile.Net, i.Tech Clip D-Radio Bluetooth Stereo Headset with Display Product Information, downloaded from http://www.hi-mobile.net/i-tech-bluetooths-clip-d-radio on Apr. 2010.
Nokia Stuff, Nokia BH-216 Bluetooth Headset with Display Product Information, downloaded from http://www.nokiastuff.net/nokia-bh-216-bluetooth-headset-with-display on Apr. 2010.
The Society of Motion Picture and Television Engineers. Proposed SMPTE Standard for Television—Format for Non-PCM Audio and Data in an AES3 Serial Digital Audio Interface, SMPTE Journal, Apr. 2000.
International Telecommunication Union, Procedures for the simultaneous transmission of data and digitally encoded voice signals over the GSTN, or over a 2-wire leased point to point telephone type circuits, Aug. 1, 1996.
Walt Kester, MT-022 Tutorial: ADC Architectures III: Sigma-Delta ADC Basics, 2009.
NXP Semiconductors, TFA9881: PDM input mono class D audio amplifier, marked as confidential as of May 18, 2009.
Yeow, Fourth Office Action for CA2,759,946 dated Jul. 5, 2016.
Document relating to EP Application No. 14156604.2, dated Apr. 23, 2014 (Extended European Search Report).
Ito T. et al.: "mB1C Code and Its Performance in an Optical Communication System", IEEE Transactions on Communications, IEEE Service Center, Piscataway, NJ, USA, vol. COM-32, No. 2, Feb. 1, 1984, pp. 163-168, XP000758558, ISSN: 0090-6778.
Fairhurst G.: "Manchester Encoding", Internet Citation, Sep. 2001, XP002348542, Retrieved from the Internet: URL: http://www.erg.abdn.ac.uk/users/gorry/course/phy-pages/man.html [retrieved on Oct. 11, 2005].
Document relating to U.S. Appl. No. 13/282,577, dated Feb. 20, 2014 (Office Action).
Document relating to U.S. Appl. No. 13/020,850, dated Mar. 17, 2014 (Informal or Non-responsive amendment).
Document relating to U.S. Appl. No. 13/020,850 dated Mar. 21, 2014 (Notice re non-compliant or non-responsive amendment).
Document relating to CA Application No. 2,759,946, dated Jan. 29, 2014 (Response).
Document relating to CN Application No. 201110404887.7, dated Feb. 11, 2014 (Office Action).
Document relating to CN Application No. 201110404887.7, dated Mar. 5, 2014 (Response).
Atmel Corporation. AVR 318: Dallas 1-Wire master. Application Note. 2004.
Document relating to U.S. Appl. No. 13/020,850 dated Dec. 17, 2013 (Office Action).
Document relating to U.S. Appl. No. 13/784,457 dated Nov. 8, 2013 (Preliminary Amendment).
Document relating to Chinese Application No. 201110404887.7 dated Dec. 6, 2012 (Voluntary Amendment).
Document relating to CA Application No. 2759946, dated Jul. 30, 2013 (Office Action).
Document relating to U.S. Appl. No. 13/803,393, dated Jun. 6, 2013 (Preliminary Amendment).
Document relating to U.S. Appl. No. 13/784,457, dated Mar. 18, 2013 (Preliminary Amendment).
Document relating to U.S. Appl. No. 13/784,457, dated Mar. 8, 2013 (Preliminary Amendment).
Extended European Search Report Response, European Patent Application No. 10193567.4, dated Jul. 2, 2012.
Communication Pursuant to Article 94(3), European Patent Application No. 10193567.4, dated Aug. 6, 2012.
Communication Pursuant to Article 94(3) Response, European Patent Application No. 10193567.4, dated Dec. 7, 2012.
European Patent Office, Partial European Search Report for EP Patent App. No. 10193567.4, dated May 11, 2011.
European Patent Office, Extended European Search Report for EP Patent App. No. 10193567.4, dated Sep. 7, 2011.
Document relating to EP Application No. 10193567.4, dated May 8, 2014 (Summons to attend oral proceedings).
"Input Output Three-state logic", Wikipedia, Nov. 28, 2010, XP055112748, Retrieved from the Internet: URL: http://en.wikipedia.org/w/index.php?title=Three-state_logic&oldid=399253635 [retrieved on Apr. 8, 2014].
Document relating to U.S. Appl. No. 13/282,577, dated May 16, 2014 (Amendment).
Document relating to U.S. Appl. No. 13/020,850, dated May 21, 2014 (Amendment).
Prosecution Documents for U.S. Appl. No. 12/958,942, issue fee paid on May 26, 2014.
Document relating to CN Application No. 201110404887.7, dated Jun. 4, 2014 (Office Action).
Document relating to U.S. Appl. No. 13/020,850, dated Jun. 2, 2014 (Final Office Action).

\* cited by examiner

| B7 | B6 | B5 | B4 | B3 | B2 | B1 | B0 |
|---|---|---|---|---|---|---|---|
| 0 | 0 | POWER | SIOEN | DIV 3 | DIV 2 | DIV 1 | DIV 0 |

Figure 6

| B7 | B6 | B5 | B4 | B3 | B2 | B1 | B0 |
|---|---|---|---|---|---|---|---|
| BUS ERROR (read/write) | IO ERROR (read/write) | X15 DELAY (read/write) | ATTENTION (read/write) | ATTACHMENT (read/write) | WR (read/write) | RD (read/write) | FRAME DONE (read/write) |

Figure 7

| B7 | B6 | B5 | B4 | B3 | B2 | B1 | B0 |
|---|---|---|---|---|---|---|---|
| BUS ERROR (read/write) | IO ERROR (read/write) | STATUS1 (read/write) | STATUS0 (read/write) | ATTACHMENT (read/write) | WR (read/write) | RD (read/write) | FRAME DONE (read/write) |

| X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| S8L | S8H | S9L | S9H | S10L | S10H | S11L | S11H | S12L | S12H | S13L | S13H | 1 | 1 | 1 | IRQ |
| (r) | (r) | (r) | (r) | (r) | (r) | (r) | (r) | (r) | (r) | (r) | (r) | (w) | (w) | (w) | (r) |

Figure 10a

| Y0 | Y1 | Y2 | Y3 | Y4 | Y5 | Y6 | Y7 | Y8 | Y9 | Y10 | Y11 | Y12 | Y13 | Y14 | Y15 |
|---|---|---|---|---|---|---|---|---|---|---|---|---|---|---|---|
| S0L | S0H | S1L | S1H | S2L | S2H | S3L | S3H | S4L | S4H | S5L | S5H | S6L | S6H | S7L | S7H |
| (r) | (r) | (r) | (r) | (r) | (r) | (r) | (r) | (r) | (r) | (r) | (r) | (r) | (r) | (r) | (r) |

Figure 10b

| X15 | X14 | X13 | X12 | X11 | X10 | X9 | X8 | X7 | X6 | X5 | X4 | X3 | X2 | X1 | X0 |
|---|---|---|---|---|---|---|---|---|---|---|---|---|---|---|---|
| IRQ (r) | 0 (w) | 1 (w) | DEV3 (w) | DEV2 (w) | DEV1 (w) | DEV0 (w) | REG6 (w) | REG5 (w) | REG4 (w) | REG3 (w) | REG2 (w) | REG1 (w) | REG0 (w) | RD15 (r) | RD14 (r) |

Figure 11a

| Y15 | Y14 | Y13 | Y12 | Y11 | Y10 | Y9 | Y8 | Y7 | Y6 | Y5 | Y4 | Y3 | Y2 | Y1 | Y0 |
|---|---|---|---|---|---|---|---|---|---|---|---|---|---|---|---|
| RD13 (r) | RD12 (r) | RD11 (r) | RD10 (r) | RD9 (r) | RD8 (r) | RD7 (r) | RD6 (r) | RD5 (r) | RD4 (r) | RD3 (r) | RD2 (r) | RD1 (r) | RD0 (r) | PAR (w) | ACK (r) |

Figure 11b

| X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| WD14 (w) | WD15 (w) | REG0 (w) | REG1 (w) | REG2 (w) | REG3 (w) | REG4 (w) | REG5 (w) | REG6 (w) | DEV0 (w) | DEV1 (w) | DEV2 (w) | DEV3 (w) | 0 (w) | 0 (w) | IRQ (r) |

Figure 12a

| Y0 | Y1 | Y2 | Y3 | Y4 | Y5 | Y6 | Y7 | Y8 | Y9 | Y10 | Y11 | Y12 | Y13 | Y14 | Y15 |
|---|---|---|---|---|---|---|---|---|---|---|---|---|---|---|---|
| ACK (r) | PAR (w) | WD0 (w) | WD1 (w) | WD2 (w) | WD3 (w) | WD4 (w) | WD5 (w) | WD6 (w) | WD7 (w) | WD8 (w) | WD9 (w) | WD10 (w) | WD11 (w) | WD12 (w) | WD13 (w) |

Figure 12b

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | 1 | 0 | 1 | 1 | 0 | 0 | 1 | 0 | 0 | 1 | 0 | 1 | CR3 | CR2 | CR1 | CR0 |
| 010 | X15 | X14 | X13 | X12 | X11 | X10 | X9 | X8 | X7 | X6 | X5 | X4 | X3 | X2 | X1 | X0 |
| 020 | Y15 | Y14 | Y13 | Y12 | Y11 | Y10 | Y9 | Y8 | Y7 | Y6 | Y5 | Y4 | Y3 | Y2 | Y1 | Y0 |

Figure 13a

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | 1 | 0 | 1 | 1 | 0 | 0 | 1 | 0 | 0 | 1 | 0 | 1 | CR3 | CR2 | CR1 | CR0 |
| 010 | Z | Z | Z | Z | Z | Z | Z | Z | Z | Z | Z | Z | Z | Z | Z | Z |
| 020 | Z | Z | Z | Z | Z | Z | Z | Z | Z | Z | Z | Z | Z | Z | Z | Z |
| 030 | Z | Z | Z | Z | Z | Z | Z | Z | Z | Z | Z | Z | Z | Z | Z | Z |
| 040 | Z | Z | Z | Z | Z | Z | Z | Z | Z | Z | Z | Z | Z | Z | Z | Z |
| 050 | Z | Z | Z | Z | Z | Z | Z | Z | Z | Z | Z | Z | Z | Z | Z | Z |
| 060 | Z | Z | Z | Z | X15 | X14 | X13 | X12 | X11 | X10 | X9 | X8 | X7 | X6 | X5 | X4 |
| 070 | X3 | X2 | X1 | X0 | Z | Z | Z | Z | Z | Z | Z | Z | Z | Z | Z | Z |
| 080 | Z | Z | Z | Z | Z | Z | Z | Z | Z | Z | Z | Z | Z | Z | Z | Z |
| 090 | Z | Z | Z | Z | Z | Z | Z | Z | Z | Z | Z | Z | Z | Z | Z | Z |
| 0A0 | Z | Z | Z | Z | Z | Z | Z | Z | Z | Z | Z | Z | Z | Z | Z | Z |
| 0B0 | Z | Z | Z | Z | Z | Z | Z | Z | Y15 | Y14 | Y13 | Y12 | Y11 | Y10 | Y9 | Y8 |
| 0C0 | Y7 | Y6 | Y5 | Y4 | Y3 | Y2 | Y1 | Y0 | Z | Z | Z | Z | Z | Z | Z | Z |
| 0D0 | Z | Z | Z | Z | Z | Z | Z | Z | Z | Z | Z | Z | Z | Z | Z | Z |
| 0E0 | Z | Z | Z | Z | Z | Z | Z | Z | Z | Z | Z | Z | Z | Z | Z | Z |
| 0F0 | Z | Z | Z | Z | Z | Z | Z | Z | Z | Z | Z | Z | Z | Z | Z | Z |
| 100 | Z | Z | Z | Z | Z | Z | Z | Z | Z | Z | Z | Z | Z | Z | Z | Z |
| 110 | Z | Z | Z | Z | Z | Z | Z | Z | Z | Z | Z | Z | Z | Z | Z | Z |
| 120 | Z | Z | Z | Z | Z | Z | Z | Z | Z | Z | Z | | | | | |

Figure 13b

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | 1 | 0 | 1 | 1 | 0 | 0 | 1 | 0 | 0 | 1 | 0 | 1 | CR3 | CR2 | CR1 | CR0 |
| 010 | Z | Z | Z | Z | Z | Z | Z | Z | Z | Z | Z | Z | Z | Z | Z | Z |
| 020 | Z | Z | Z | Z | Z | Z | Z | Z | Z | Z | Z | Z | Z | Z | Z | Z |
| 030 | Z | Z | Z | Z | Z | Z | Z | Z | Z | Z | Z | Z | Z | Z | Z | Z |
| 040 | Z | Z | Z | Z | Z | Z | Z | Z | Z | Z | Z | Z | Z | Z | Z | Z |
| 050 | Z | Z | Z | Z | Z | Z | Z | Z | Z | Z | Z | Z | Z | Z | Z | Z |
| 060 | Z | Z | Z | Z | Z | Z | Z | Z | Z | Z | Z | Z | Z | Z | Z | Z |
| 070 | Z | Z | Z | Z | Z | Z | Z | Z | Z | Z | Z | Z | Z | Z | Z | Z |
| 080 | X15 | X14 | X13 | X12 | X11 | X10 | X9 | X8 | X7 | X6 | X5 | X4 | X3 | X2 | X1 | X0 |
| 090 | Z | Z | Z | Z | Z | Z | Z | Z | Z | Z | Z | Z | Z | Z | Z | Z |
| 0A0 | Z | Z | Z | Z | Z | Z | Z | Z | Z | Z | Z | Z | Z | Z | Z | Z |
| 0B0 | Z | Z | Z | Z | Z | Z | Z | Z | Z | Z | Z | Z | Z | Z | Z | Z |
| 0C0 | Z | Z | Z | Z | Z | Z | Z | Z | Z | Z | Z | Z | Z | Z | Z | Z |
| 0D0 | Z | Z | Z | Z | Z | Z | Z | Z | Z | Z | Z | Z | Z | Z | Z | Z |
| 0E0 | Z | Z | Z | Z | Z | Z | Z | Z | Z | Z | Z | Z | Z | Z | Z | Z |
| 0F0 | Z | Z | Z | Z | Z | Z | Z | Z | Z | Z | Z | Z | Z | Z | Z | Z |
| 100 | Y15 | Y14 | Y13 | Y12 | Y11 | Y10 | Y9 | Y8 | Y7 | Y6 | Y5 | Y4 | Y3 | Y2 | Y1 | Y0 |
| 110 | Z | Z | Z | Z | Z | Z | Z | Z | Z | Z | Z | Z | Z | Z | Z | Z |
| 120 | Z | Z | Z | Z | Z | Z | Z | Z | Z | Z | Z | Z | Z | Z | Z | Z |
| 130 | Z | Z | Z | Z | Z | Z | Z | Z | Z | Z | Z | Z | Z | Z | Z | Z |
| 140 | Z | Z | Z | Z | Z | Z | Z | Z | Z | Z | Z | Z | Z | Z | Z | Z |
| 150 | Z | Z | Z | Z | Z | Z | Z | Z | Z | Z | Z | Z | Z | Z | Z | Z |
| 160 | Z | Z | Z | Z | Z | Z | Z | Z | Z | Z | Z | Z | Z | Z | Z | Z |
| 170 | Z | Z | Z | Z | Z | Z | Z | Z | Z | Z | Z | Z | Z | Z | Z | Z |

Figure 13c

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | 1 | S0 | S1 | S2 | 1 | S0 | S1 | S2 | 1 | S0 | S1 | S2 | 1 | S0 | S1 | S2 |
| 010 | 1 | S0 | S1 | S2 | 1 | S0 | S1 | S2 | 1 | S0 | S1 | S2 | 1 | S0 | S1 | S2 |
| 020 | 1 | S0 | S1 | S2 | 1 | S0 | S1 | S2 | 1 | S0 | S1 | S2 | 0 | S0 | S1 | S2 |
| 030 | CR3 | S0 | S1 | S2 | CR2 | S0 | S1 | S2 | CR1 | S0 | S1 | S2 | CR0 | S0 | S1 | S2 |
| 040 | X15 | S0 | S1 | S2 | X14 | S0 | S1 | S2 | X13 | S0 | S1 | S2 | X12 | S0 | S1 | S2 |
| 050 | X11 | S0 | S1 | S2 | X10 | S0 | S1 | S2 | X9 | S0 | S1 | S2 | X8 | S0 | S1 | S2 |
| 060 | X7 | S0 | S1 | S2 | X6 | S0 | S1 | S2 | X5 | S0 | S1 | S2 | X4 | S0 | S1 | S2 |
| 070 | X3 | S0 | S1 | S2 | X2 | S0 | S1 | S2 | X1 | S0 | S1 | S2 | X0 | S0 | S1 | S2 |
| 080 | Y15 | S0 | S1 | S2 | Y14 | S0 | S1 | S2 | Y13 | S0 | S1 | S2 | Y12 | S0 | S1 | S2 |
| 090 | Y11 | S0 | S1 | S2 | Y10 | S0 | S1 | S2 | Y9 | S0 | S1 | S2 | Y8 | S0 | S1 | S2 |
| 0A0 | Y7 | S0 | S1 | S2 | Y6 | S0 | S1 | S2 | Y5 | S0 | S1 | S2 | Y4 | S0 | S1 | S2 |
| 0B0 | Y3 | S0 | S1 | S2 | Y2 | S0 | S1 | S2 | Y1 | S0 | S1 | S2 | Y0 | S0 | S1 | S2 |

Figure 13d

| BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | 1 | S0 | S1 | S2 | S3 | S4 | S5 | S6 | 1 | S0 | S1 | S2 | S3 | S4 | S5 | S6 |
| 010 | 1 | S0 | S1 | S2 | S3 | S4 | S5 | S6 | 1 | S0 | S1 | S2 | S3 | S4 | S5 | S6 |
| 020 | 1 | S0 | S1 | S2 | S3 | S4 | S5 | S6 | 1 | S0 | S1 | S2 | S3 | S4 | S5 | S6 |
| 030 | 1 | S0 | S1 | S2 | S3 | S4 | S5 | S6 | 1 | S0 | S1 | S2 | S3 | S4 | S5 | S6 |
| 040 | 1 | S0 | S1 | S2 | S3 | S4 | S5 | S6 | 1 | S0 | S1 | S2 | S3 | S4 | S5 | S6 |
| 050 | 1 | S0 | S1 | S2 | S3 | S4 | S5 | S6 | 0 | S0 | S1 | S2 | S3 | S4 | S5 | S6 |
| 060 | CR3 | S0 | S1 | S2 | S3 | S4 | S5 | S6 | CR2 | S0 | S1 | S2 | S3 | S4 | S5 | S6 |
| 070 | CR1 | S0 | S1 | S2 | X2 | S0 | S1 | S2 | CR1 | S0 | S1 | S2 | S3 | S4 | S5 | S6 |
| 080 | X15 | S0 | S1 | S2 | S3 | S4 | S5 | S6 | X14 | S0 | S1 | S2 | Y12 | S0 | S1 | S2 |
| 090 | X13 | S0 | S1 | S2 | S3 | S4 | S5 | S6 | X12 | S0 | S1 | S2 | S3 | S4 | S5 | S6 |
| 0A0 | X11 | S0 | S1 | S2 | S3 | S4 | S5 | S6 | X10 | S0 | S1 | S2 | S3 | S4 | S5 | S6 |
| 0B0 | X9 | S0 | S1 | S2 | S3 | S4 | S5 | S6 | X8 | S0 | S1 | S2 | S3 | S4 | S5 | S6 |
| 0C0 | X7 | S0 | S1 | S2 | S3 | S4 | S5 | S6 | X6 | S0 | S1 | S2 | S3 | S4 | S5 | S6 |
| 0D0 | X5 | S0 | S1 | S2 | S3 | S4 | S5 | S6 | X4 | S0 | S1 | S2 | S3 | S4 | S5 | S6 |
| 0E0 | X3 | S0 | S1 | S2 | S3 | S4 | S5 | S6 | X2 | S0 | S1 | S2 | S3 | S4 | S5 | S6 |
| 0F0 | X1 | S0 | S1 | S2 | S3 | S4 | S5 | S6 | X0 | S0 | S1 | S2 | S3 | S4 | S5 | S6 |
| 100 | Y15 | S0 | S1 | S2 | S3 | S4 | S5 | S6 | Y14 | S0 | S1 | S2 | S3 | S4 | S5 | S6 |
| 110 | Y13 | S0 | S1 | S2 | S3 | S4 | S5 | S6 | Y12 | S0 | S1 | S2 | S3 | S4 | S5 | S6 |
| 120 | Y11 | S0 | S1 | S2 | S3 | S4 | S5 | S6 | Y10 | S0 | S1 | S2 | S3 | S4 | S5 | S6 |
| 130 | Y9 | S0 | S1 | S2 | X2 | S0 | S1 | S2 | Y8 | S0 | S1 | S2 | X2 | S0 | S1 | S2 |
| 140 | Y7 | S0 | S1 | S2 | S3 | S4 | S5 | S6 | Y6 | S0 | S1 | S2 | S3 | S4 | S5 | S6 |
| 150 | Y5 | S0 | S1 | S2 | S3 | S4 | S5 | S6 | Y4 | S0 | S1 | S2 | S3 | S4 | S5 | S6 |
| 160 | Y3 | S0 | S1 | S2 | S3 | S4 | S5 | S6 | Y2 | S0 | S1 | S2 | S3 | S4 | S5 | S6 |
| 170 | Y1 | S0 | S1 | S2 | S3 | S4 | S5 | S6 | Y0 | S0 | S1 | S2 | S3 | S4 | S5 | S6 |

Figure 13e

SINGLE WIRE BUS SYSTEM

CROSS-REFERENCE TO RELATED APPLICATION

This application is a continuation of U.S. patent application Ser. No. 12/958,942, filed Dec. 2, 2010. The entire contents of U.S. application Ser. No. 12/958,942 are hereby incorporated by reference.

FIELD OF THE DISCLOSURE

The present disclosure is generally directed at bus systems and more specifically at a single wire bus system.

BACKGROUND OF THE DISCLOSURE

In a computer or processor architecture, a bus is a subsystem that transfers data between computer components within a computer or between computers. Bus architectures are also used in common data signalling paths for multiple devices, rather than having separate connections between each set of devices that need to communicate. In other words, the bus structure can be used to allow one or more slave devices to communicate with one or more master devices.

SUMMARY OF THE DISCLOSURE

A single bus architecture is described below as a system that communicates over a single wire, and includes sync, control, data, clock and power over this transmission media. The bus may be used for operation where the number of pins or wires is limited or where high reliability with respect to noise immunity is desired. The bus of the current disclosure has the advantage in that it allows continuous operation of a number of external devices and that all devices are synchronized by the same clock signal.

The single bus architecture is based on a continuous clock source charging a wire, a PCB trace or a transmission line, and allows a variable number of receivers, such as slave devices, to discharge the line at specified time instants in order to provide a communication link. If the system clock frequency is low, a bus holder may be added to the system to maintain the charge on the wire.

BRIEF DESCRIPTION OF THE DETAILED DRAWINGS

Embodiments of the present disclosure are now described, by way of example only, with reference to the attached Figures, wherein:

FIG. 6 is a schematic diagram of an interface control register;

FIG. 7 is a schematic diagram of an IRQ mask;

FIG. 8 is a schematic diagram of a status register;

FIG. 9 is a schematic diagram of how a sync word is transmitted;

FIG. 10a is a schematic diagram of an X word in ping operation;

FIG. 10b is a schematic diagram of an Y word in ping operation;

FIG. 11a is a schematic diagram of an X word for read operations;

FIG. 11b is a schematic diagram of a Y word for read operations;

FIG. 12a is a schematic diagram of an X word for write operations;

FIG. 12b is a schematic diagram of a Y word for write operations; and

FIGS. 13a to 13e are schematic diagrams of example time frames.

DETAILED DESCRIPTION

The disclosure is directed at a single bus architecture for communication between at least two devices, such as master and slave devices. Transmission between the master and slave devices include a continuous clock system and bi-directional data.

In bus architectures, there is often a mechanism for devices to signal when they need to use the bus, while it is in use, and the nature of the use, such as for data, the transmission of instructions, the transmission of control information or signals. etc., however, bus control can become quite complicated when numerous asynchronous processes are attempting to share the bus efficiently. Systems usually require multiple wires and bonding pads which results in a system with a higher cost. When such systems are used with external devices, multiple connectors are also needed resulting in larger space requirements.

Figure 1:
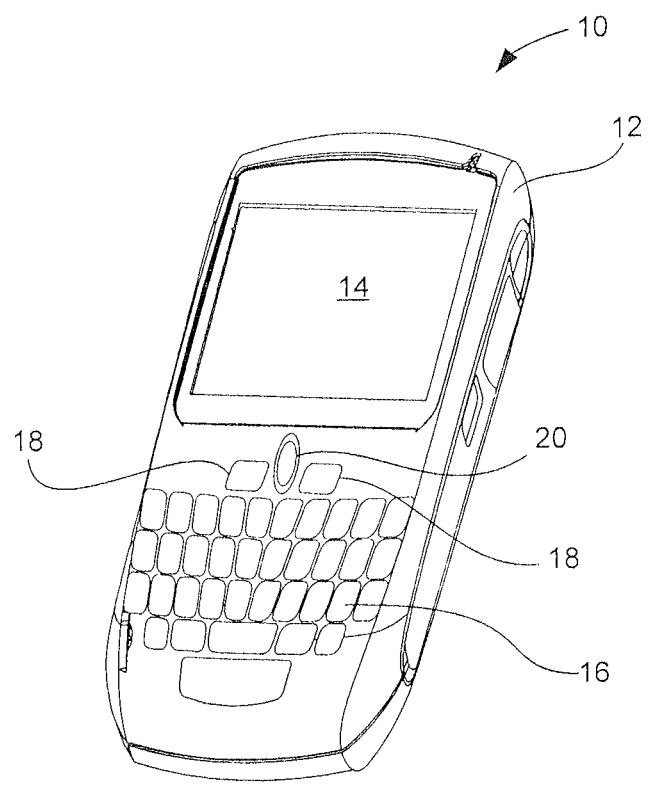
FIG. 1 is a perspective view of a portable electronic device.

Turning to FIG. 1, a schematic diagram of a portable electronic, such as a mobile communication device, is shown. The portable electronic device 10 has a body 12 which includes a display screen 14, a keyboard/keypad 16, a set of buttons 18 and a user input device 20, such as a trackpad or a trackball 20. It will be understood that the user input device 20 is representative of a user-operated pointing or input device, which could also be presented as a joystick, scroll wheel, roller wheel, mouse or touchpad or the like, or another button. The device 10 includes other parts which are not shown or described. The portable electronic device 10 also includes at least one port for receiving a jack, but this is not shown in FIG. 1.

Figure 2:
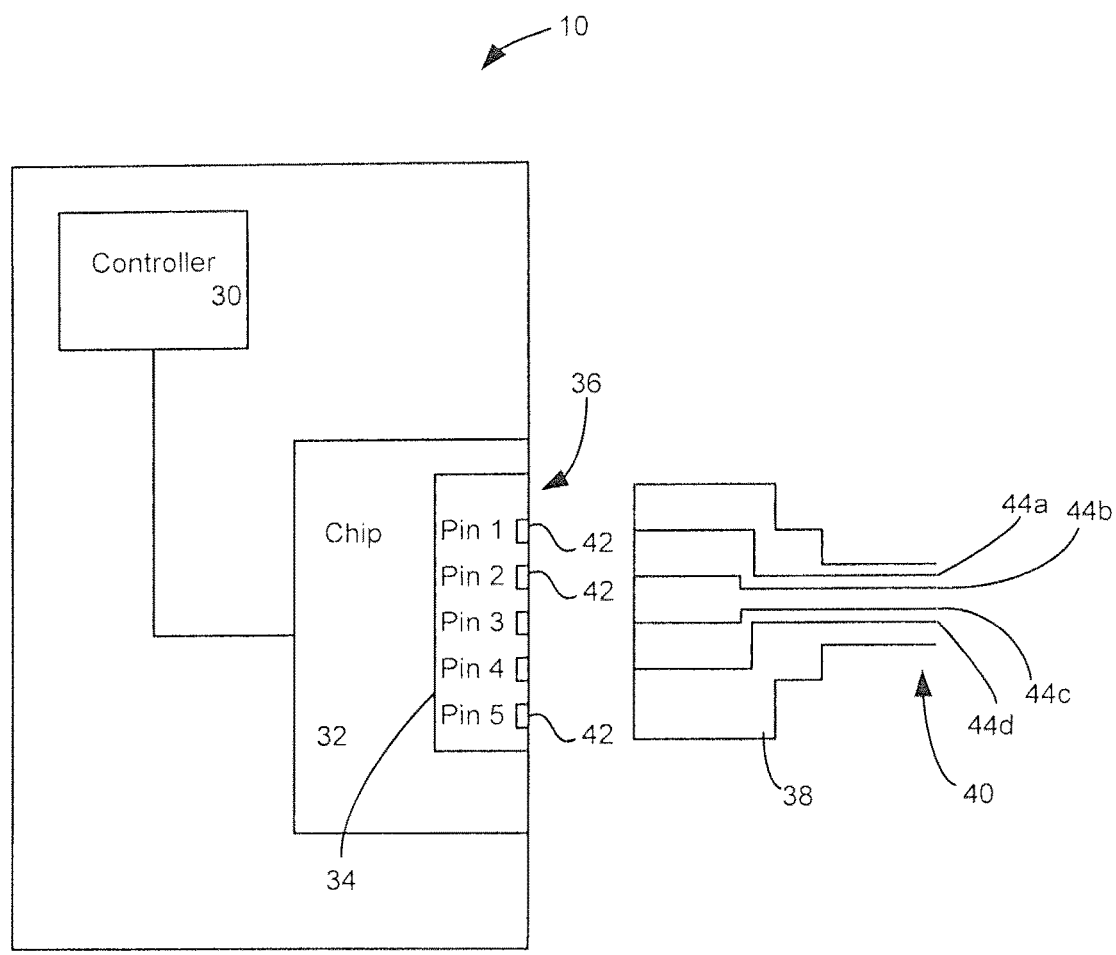
FIG. 2 is a block diagram of a portable electronic device.

Turning to FIG. 2, the portable electronic device 10 further includes a controller, or processor, 30 which is connected to a chip 32, such as a headset or headphone interface chip, which is integrated within the communication device 10. The chip 32 includes a switch matrix and jack configuration detect portion 34 which is integrated with a port 36 for receiving a jack 38 associated with a cable 40, such as a video cable or a headset cable. The switch matrix 34 includes a plurality of individual input and output ports 42 for receiving and transmitting signals with corresponding wires 44 within the jack 38.

The wires or lines 44 within the jack 38 represent signal lines, such as audio and video lines. The set of individual lines, typically four, although other jack configurations are contemplated, allow for communication between the portable electronic device and a device located at the end of the cable, such as a headset. In one embodiment, the lines 44 include a pair of audio lines 44a and 44b, a ground line 44c and a microphone line 44d. However, only one of the lines is required for communication and thereby serves as the communication bus for the single wire bus system 10. The remaining lines may be used for other functionality. Typically, one line will be used for ground while the remaining two lines may be used for headphone output. In another configuration, one line may be used for the single wire bus, one will be used for ground and a third line may provide power and the last line is left for other purposes such as a separate clocking line, for transmission of video signals or for other functionality. In other embodiments, the single wire bus may be used in any digital or analog transmissions between devices and not between a portable electronic device and headset.

Figure 3:
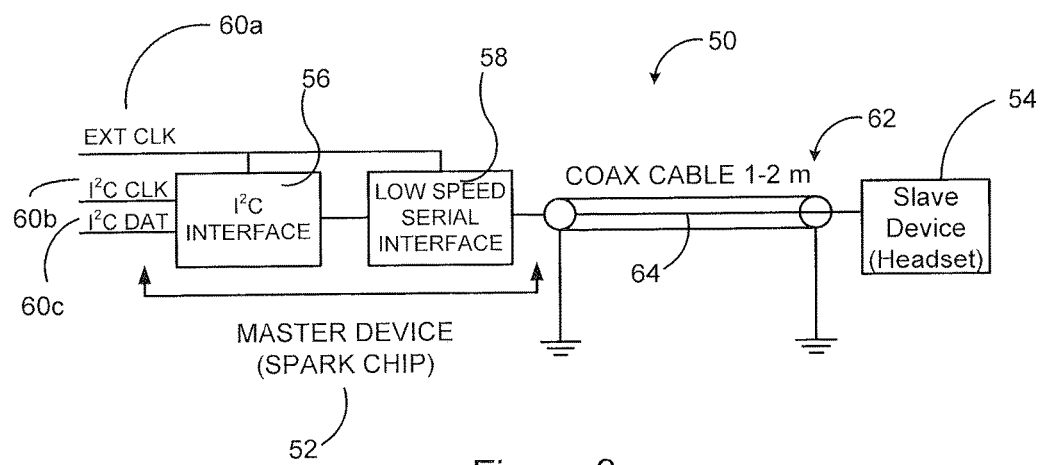
FIG. 3 is a schematic diagram of a single wire bus system.

Turning to FIG. 3, a schematic diagram of a single wire bus system is shown. The single wire bus system 50 includes a master device 52, such as a portable electronic device or a headset interface chip within a portable electronic device, and a slave device 54, such as a headset. Although only one slave device shown, it will be understood that multiple slave devices may be connected to the master device 52. The master device 52 or slave device 54 may include an Inter-Integrated Circuit (I²C) interface 56 which is connected to a baseband processor or other mobile processing unit. The master or slave device may also include an I²C interface for digital audio data. Inputs, or input signals, 60 to the I²C interface 56 and a serial interface 58 may include, but are not limited to, an external clock 60a (EXT CLK), an I²C clock 60b (I²C CLK) and an I²C data signal 60c (I²C DAT). An output of the low speed serial interface 58 is connected to the slave device 54 via a cable 62, such as a co-axial cable. As described above, one of the wires 64 within the cable 62 is used for communication between the slave device 54 and the master device 52 and can be seen as the single wire bus.

One advantage of the current disclosure is that with this architecture, a single wire bus may combine multiple functions, including, but not limited to, the transmission of both clock and data in a single bus cycle. In operation, the I²C interface 56 retrieves and sends data to the slave device 54 over the designated single wire 64, or line. In other embodiments, the single wire bus may be controlled via a connection to the baseband processor or other processing unit. The master device 52 generates framing information in order to allow the slave device 54, or multiple slave devices, to be synchronized to the single wire, or communication, bus 64. In one embodiment, the frame length is determined by an 8-bit register that provides a separation distance between the start of each block of command data. In another embodiment, the unit of measure is a nibble which equals four (4) bits. The minimum frame length is determined by the command pattern and in one embodiment may be 48 bits with a default sync separation value of 28 nibbles thereby resulting in a frame length of 384 bits.

In operation, a synchronization signal (sync), control signals of information, data, a clock signal and power is transmitted between the master device 52 and the slave device 54 over the single wire bus 64. The clock signal can be used as sampling clock for internal circuits such as sigma-delta converters or for continuous operation of a complex logic circuit.

One advantage of the system is that the size of components for use in communication via the single wire bus may be decreased. For example, if implemented in the portable electronic device of FIG. 2, the single wire bus of the present disclosure allows for the clock signal and the data to be transmitted over a single wire which reduces the number of pins required to be occupied in the chip 32 thereby allowing the other pin ports 42 to be used for other functionality or to reduce the total pin-count, silicon area or cost of the chip.

In one embodiment, the bus is implemented using a low-high-float cyclic pattern but may alternatively be implemented as a high-low-float pattern. The float period is used for signalling, while the low-high (or high-low) period is used to transfer power and for clock synchronization. As the period during which the bus floats is very short, it may be kept stable due to parasitic capacitances or may be kept stable for longer periods of time by including a bus holder within the system. Therefore, the charge and therefore the voltage on the bus may be considered stable, if unloaded statically or loaded by a high impedance. In a given implementation, either a low-to-high or a high-to-low edge triggered phase lock loop (PLL) may be used for synchronization, though it is possible to synchronize an external device to the bus using controlled delays with a delay locked loop (DLL) or a fixed delay value circuit. The delay unit may comprise two capacitors that are being alternately charged by a fixed current and then using the charging voltage on the capacitors to determine the points where the bus should be activated and sampled. These two capacitors may be charged from one fixed clock edge to the second fixed clock edge and discharged before starting this cycle.

In one embodiment, a minimum bus capacitance and minimum clock frequency should be observed (i.e. be sufficiently high), so that the reading of the status of the bus during the floating, or tri-state, period is uniquely defined. If the bus system is implemented on a printed circuit board, a small capacitor may be used to provide a significantly large charge to protect against data errors. In this case, a small but finite bus capacitance is required or alternatively implemented using the bus holder (e.g. using two inverters coupled back-to-back) to maintain a stable bus value. This method may be chosen for low frequency operation of the bus, where small leakage currents may slowly discharge any charges left on the bus, but a bus holder will keep the value stable. The bus holder will normally be implemented in the master device to limit the power efficiency loss associated with its operation but can also be implemented in slave devices for data integrity purposes.

Furthermore, if a slave device or the master device wants to signal a logic zero, that device will leave the bus in the same state as before i.e. floating and with the same value on the bus as will be discussed below. In one advantage of the disclosure, the bus structure reduces or avoids bus contention, or congestion, when multiple devices try to signal, or communicate over the bus, at the same time, since once the bus has been discharged, the discharge of the bus by subsequent devices is not detected and bus collision is not possible.

Figure 4A:
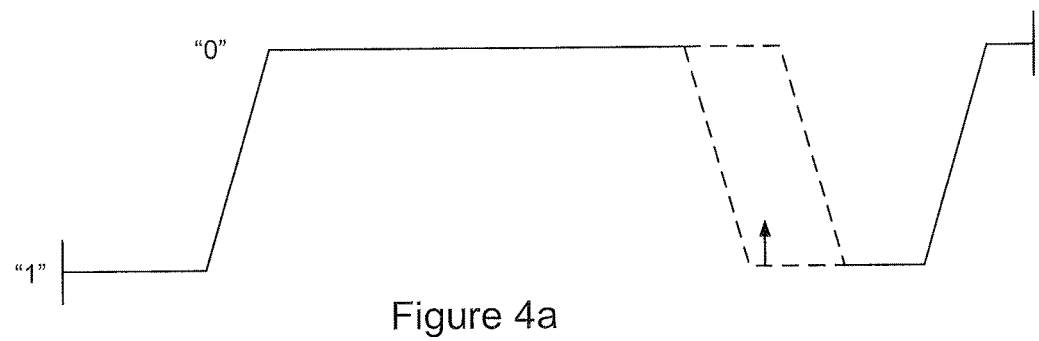
FIG. 4a is a schematic diagram of a timing diagram.

Turning to FIG. 4a, a timing diagram of communication, or a communication protocol, between a master device and a slave device is shown. In the current figure, a single clock cycle is shown. At the beginning of the clock cycle, the signal on the bus is low and then is pulled high by the master device. At some point during the time cycle, this signal is pulled down, or discharged, to prepare for the next clock cycle. During periods, or clock cycles, where transfer of information is not required, it is possible to let the bus go idle by setting the clock signal constant high. Alternatively, the signal on the bus can be left low and then be pulled high in order to signal that a slave device would like to communicate with the master device or to transmit data over the bus. During one clock cycle, one bit is transmitted between the master device and the slave device.

Between the time when the clock signal is pulled high and the end of the clock cycle, there is a tri-state area where the signal can either be pulled down by the master device or the slave device. In one embodiment, if the clock signal is pulled down by the master device, the master signal a logic "1" and the next clock cycle is started. If the clock signal is pulled down by the slave device, it is the slave device that signals a logic "1". This is described in more detail below with a specific example of communication over the bus.

Figure 4B:
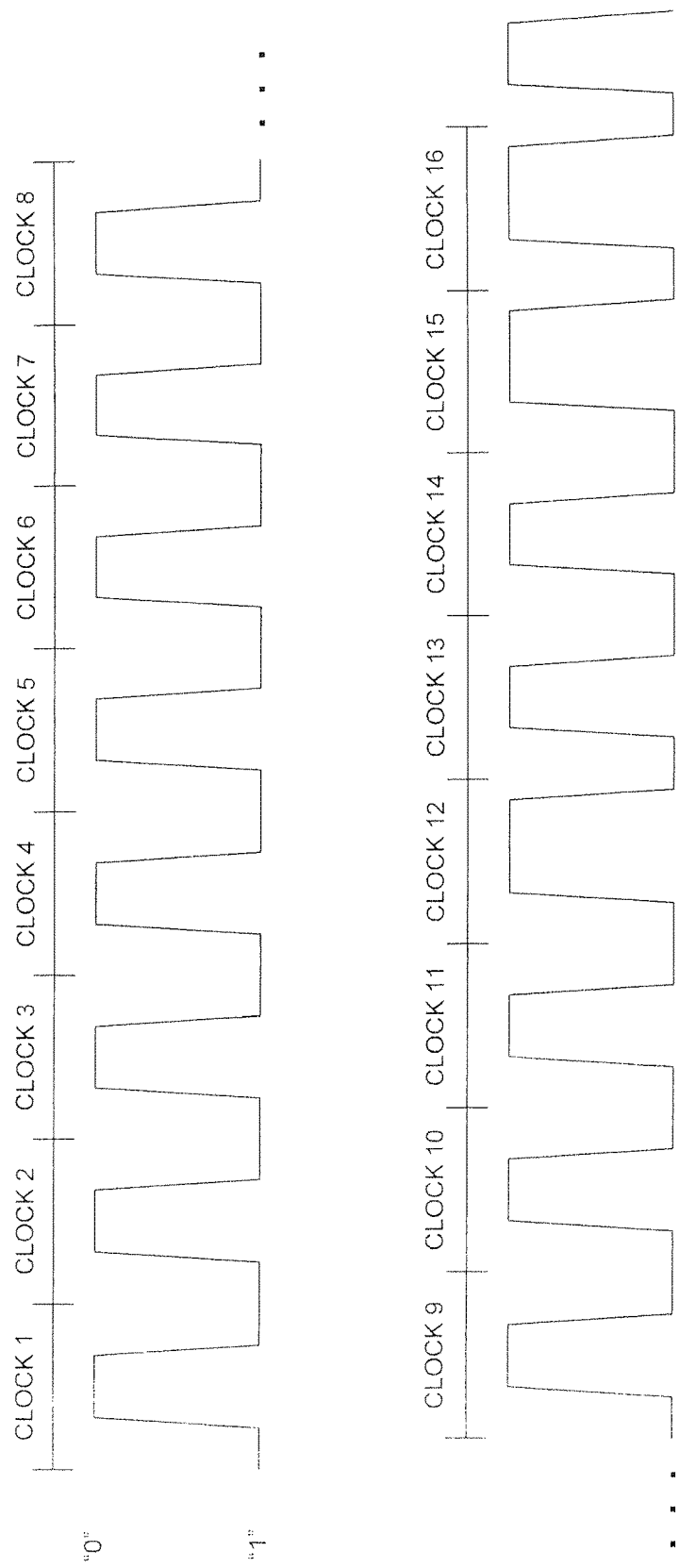
FIG. 4b is a schematic timing diagram of sixteen clock cycles.

In one example mode of operation, over 16 clock cycles, the master device transmits information, such as a sync word over the bus. As schematically shown in FIG. 4b, an example timing diagram of the master device transmitting a sync word of 111111111101100 over the single wire is shown. Therefore, for any slave devices which are connected to the bus, they may lock onto the bus via the sync word so that their internal state machines and thereby timing are synchronized with the master device.

Figure 5:
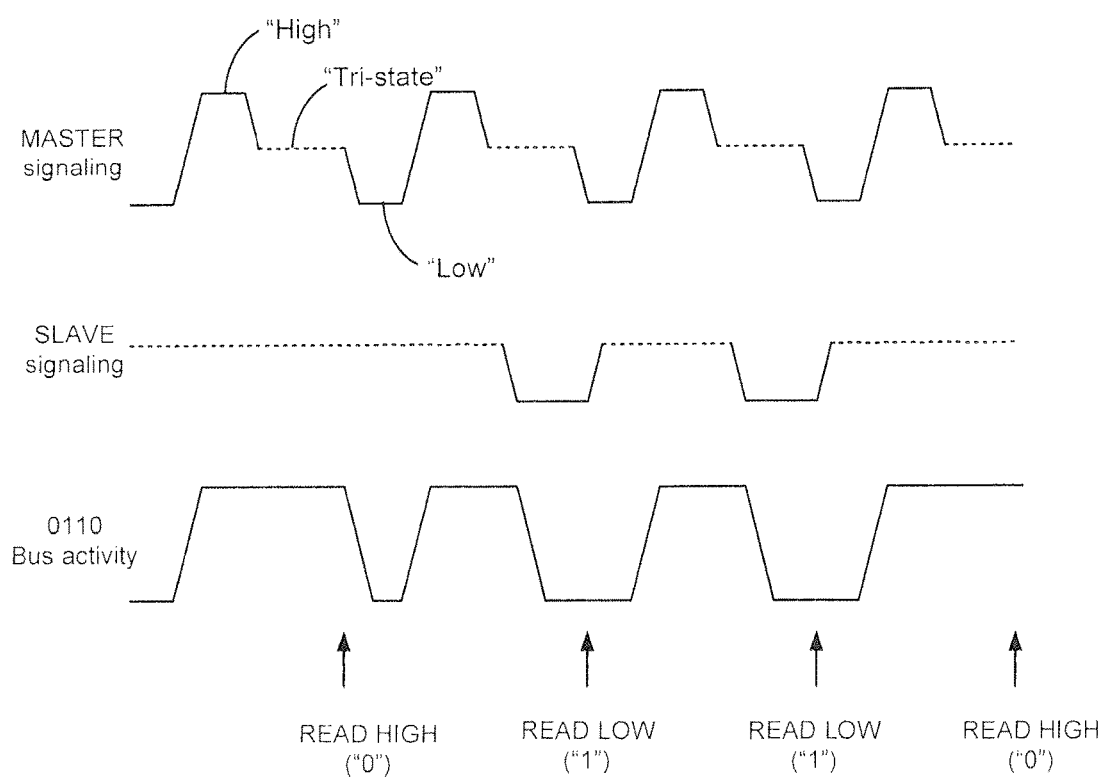
FIG. 5 is a schematic diagram of a timing diagram.

Turning to FIG. 5, a schematic diagram of a timing diagram whereby a slave device writes "0110" is shown using the communication protocol of FIG. 4a. In general, the bus is time-multiplexed in four time intervals. In operation, the bus is active low (from the previous clock cycle) for the first quarter of the clock period and then is driven active high by the master device, normally for the second quarter of the clock period. This low-high transition may be used as a continuous sampling clock signal. The bus is then left in a floating state for the remainder of the clock period unless a slave device 54 or the master device 52 pulls the bus low to signal a "1". This typically occurs in the second half of the clock period so that the bus is fully settled by the end of the clock period. The bus value is sampled near the end of the clock period just before or at the same time the master begins to drive the bus low to start the next clock cycle. In one embodiment, the first half of the clock cycle may be used for the clock signal while the second half of the clock cycle may be used for the data transmission. However, other divisions of the clock cycle are contemplated such as 67% clock and then 33% for the data transmission.

In the example of FIG. 5, the bus is initially active low at the beginning of the clock cycle. After a particular period of time, the bus is driven active high by the master device. As the slave device wishes to transmit a "0" seen as active high, the slave device does not do anything with the bus. The value of "0" is then read by the master device and the slave device before the master device drives the bus to an active low prior to the next clock cycle. During the second clock cycle, the master device drives the bus to an active high after a particular period of time. As the slave device wishes to transmit a "1", the slave device pulls or drives the bus to an active low where the value is then read by the master device and the slave device. As the bus is active low, the master device does not have to drive the bus active low, although it may perform that function as shown in FIG. 5. In the third clock cycle, after a particular period of time, the master device drives the bus to an active high. As the slave device wishes to transmit a "1", the slave device pulls or drives the bus to an active low where the value is then read by the master device and the slave device. At the start of the fourth clock cycle, the bus is active low and after a particular period of time is driven bus active high by the master device. As the slave device wishes to transmit a "0", there is no activity on the bus until after the value has been read and then the master device drives the bus active low in preparation for the next clock cycle.

The timing of when the bus is pulled low by the master device is after a particular period of time so that incorrect data is not sampled by the master or the slave devices. The slave device requires a floating output when the master device pulls the bus high.

When the master device or the slave device enters the tri-state, this is represented by dashed lines between the top (high) and bottom (low) levels even though the actual voltage will be determined by the previous values written to the bus. In the preferred embodiment, the output voltage during the tri-state is determined by the charge and parasitic load impedance of the bus, or line.

In some scenarios, it may be necessary for the slave device to activate the data line (or bus). In order to activate the bus at a particular time interval, a local clock can be implemented via a phase lock loop (PLL), a dynamic lock loop (DLL) or a delay circuit. Since the master device is used to control the timing, there is no requirement for analog controlled delays on the master device.

After indicating that there the slave device wishes to communicate with the master device by actively pulling the signal down during a ping operation, data can then be transmitted between the slave device and the master device via a read or a write operation. The master can also initiate a read or write operation on its own. In order to initiate the communication, the master device and the slave device need to be synchronized. In the current embodiment, the control words, such as the sync word, the X word and the Y word are transmitted in a single grouping of 16 bits, or clock cycles.

Figures 4C, 4D:
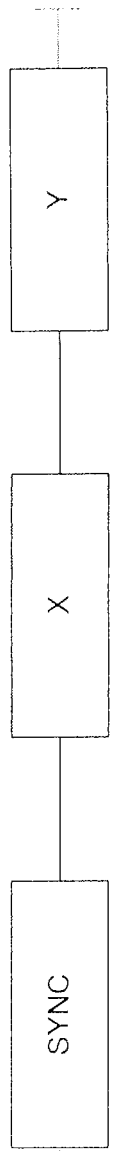
FIG. 4c is a diagram of a single time frame.
FIG. 4d is a diagram of part of a Y word.

As schematically shown in FIG. 4c, a single time frame is shown. Communication between the master device and a slave device occurs during a time frame. The transmission of a sync word by the master device allows one of the slave devices which is physically connected to the bus to be locked on for communication with the master device. Depending on the application, or use of the bus, either for audio transmission or for the transmission of bitstreams, different sync words may be used. The selection of the fixed portion of the sync word is such that it is a pattern of bits that does not regularly occur in an audio or bitstream so that its use as a sync word is not compromised. As an example, the fixed portion for an audio sync word may be 0xB25 (hexadecimal) when the bus is used in audio transmission and the fixed portion for a bitstream sync word may be 0xFFE when the bus is being used in a bitstream transmission.

Turning to FIGS. 13a to 13e, examples of various frame structures are shown. FIG. 13a is a frame structure with a command separation of 0 bits. FIG. 13b is a frame structure with a command separation of 84 bits. FIG. 13c is a frame structure with a command separation of 112 bits, FIG. 13d is a frame structure having a bit interleaved processing type with 3 bitstreams and FIG. 13e is a frame structure having a bit interleaved processing type with 7 bitstreams.

In one example, the frame length is 384 bits long, however it will be appreciated that shorter or longer lengths are contemplated and may be associated with the clock frequencies at which the bus is operating or where the oversample ratio is better suited for other numbers than 64. For instance, it may be advantageous to use oversample ratios of 50 or 100 when using a clock frequency of 19.2 MHz (commonly used in mobile systems) since this will allow support for a 48 kHz sampling rate without requiring sample rate conversion methods. In this case, a frame length of 400 may be used.

Control of the master device can be via the I²C interface, through another control interface or as part of a connection to a digital signal processor (DSP) or microprocessor unit, which will provide the necessary information to have the master device ping or perform a read or write operation. The master device also generates the framing information necessary in order to synchronize external devices to the bus. After going out of the idle operation, the interface should enter a ping operation since the slave devices are not locked to the bus after power has been down.

Between the transmission of the sync word and an X word (operation of which will be described in more detail below), random data or information may be transmitted over the bus which can be picked up by the slave devices or the master device. This information includes, but is not limited to, bit streams or audio data. Transmission of the X word allows the master and slave devices to determine if any specific function is to be executed or to determine if any interrupts have been set. After transmission of the X word (assuming that there were no interrupts set), further data, such as audio data, may be transmitted over the bus. A Y word is then transmitted which further outlines the functions and also other information between the master device and the slave devices to determine if there are any errors on the bus or with the slave devices.

Ping and read or write commands may not occur in the same frame since each frame is defined by three different functions. All frames commence with the sync word, followed by the X-word and then the Y-word. Between the command words, there may be empty space allocated for data transmission depending on the use scenario. The length of the empty space is defined by the sync separation register.

The transmission of the X or Y word may result in a ping operation, a command data read or a command data write being issued. In one embodiment, if the command is a command data read, a 16 bit word is read from the slave device which is aligned with the master device and if the command is a command data write, a 16 bit word is written to the slave device which is aligned with the master device.

In operation of one embodiment, when a ping command is issued, the X and Y command words (or registers), as shown in FIGS. 10*a* and 10*b*, respectively, are transferred to the single bus. If the slave device wishes to request an interrupt, a "1" or high logic level is written to the X15 bit in order to indicate the interrupt. This may be used to delay a read or write operation and is written before the master device is able to signal its current operation.

If the X14 register is equal to "1", a "ping" operation is initiated. This bit is written by the master. A ping operation occurs when no read or write command is being performed or if the value of X15=1 and the value of X15 DELAY B5 (IRQ mask)=1, i.e. if the interrupt mask is disabled or if a pending input/output operation has been delayed due to a recognized slave interrupt.

X word bits, X13-X12, are equal to "11" during a ping operation and any other value of this field is left for future expansion. If the value read is not "11", the contents of the command frame (X and Y values) should be ignored. The ST13:ST0 bits shall be set by any external device to indicate status and are located in the X0-11 and Y0-15 bits. Each device can respond with three different status levels or choose not to respond at all. These bits may generate an interrupt based on the setting of the interrupt mask register. This ping command is active at all times, unless the master (headset chip) has activated a read or write command and is currently processing it.

The ping command is a general command to determine the status of the devices which are connected to the bus.

In order to communicate with the slave device, the master device transmits a sync, or synchronization, word that the slave device (or devices) may use to synchronize their internal timing, or clock, with the master device. In one embodiment, the sync word comprises a 12 bit constant and a 4 bit pseudorandom value, or register value. The constant portion of the word is used by the slave device to reduce the likelihood, avoid or eliminate false sync words or positions within a frame. For instance, data may be transmitted over the single wire bus by other slave devices which appear to be the sync word but since it is not transmitted by the master device, they are, in fact, false sync words, and should be ignored by non connected slave devices. The pseudorandom register is also used to verify the start position of the frame. This allows a quicker time-to-lock and reduces the likelihood that slave devices lock on to false single words created by random data on the bus. Typically, a slave device would verify the pseudo-random pattern multiple times before locking on to the bus.

Once a slave is connected to the bus, various data, such as audio data or bitstream transmission may be transmitted over the bus. The time period between the transmission of the sync word and the X word is set to a particular value and in one embodiment is a multiple of 4 bits, or clock signals, up to a maximum of 4*255 or 1020 clock signals.

When the X word is transmitted, each of the connected slave devices may determine the type of operation, such as read or write, being performed by reviewing the X word. The master device can determine if any of the slave devices have initiated an interrupt by checking bit 15 of the X word. An interrupt may be signalled if there is an error or if one of the slave devices requires assistance or is not operating in an expected manner or has an important status message to send.

The X word represents a control word in the time frame and determines if any slave device is waiting for an interrupt request. Bit 15 of the X word, or X15, also determines the action for read or write applications and does not affect the way a ping operation is progressing. This bit may be masked so that it does not block bus traffic.

If the X15 bit has not been set, the master device and the locked on slave devices read the information from the X word to determine if there is any activity on the bus or any activity to be performed over the bus between the master device and a specific slave device.

If the X15 bit has been set and the interrupt detected and acknowledged, a signal, such as a status or ping request, a read command or a write command, is transmitted by the master device based on data received from an I²C transfer. The master device then delays the current operation in order to determine which slave device signalled the interrupt and to determine the issue that needs to be resolved. This information can be found in the Y word which is transmitted after a specific time period (which is identical to the time period between the sync word and the X word).

When a data read command is issued, the X and Y command words (or registers) as shown in FIGS. 11*a* and 11*b* respectively, are transferred to the single bus.

If a slave device needs to request an interrupt of the communications, the read operation may be delayed by activating the X15 bit, or by setting the interrupt request. If no slave device has activated this bit ('1' means activate) or if the IRQ mask is disabled, the data read command will proceed. If the delay is activated, the slave device which requested the interrupt has a status level equal to "10" or "11" and the corresponding IRQ mask bit is set. This slave device should copy the contents of the most significant bit of its status register onto the bus during the delay.

If there is no interrupt, the X14 bit is set to a "0" which signifies a read or write register operation and the setting of the X13 bit to 1 signifies a read operation.

In order to confirm if a message has been correctly received, the acknowledge message bit is written by a slave device. The value of this bit is set to logic high, when no error has been detected on the bus during the delivery or communication of command words in this frame, such that the slave device is present and has the same address that the master device has written to. The master device recognizes which slave device it is in communication with and therefore the address of the slave device may be confirmed on a regular basis to reduce the likelihood or errors. If an error has occurred (a bit read from bus is different from what was expected), the master device reports a bus error. This protects against any device unintentionally writing to the bus and against bus errors. A slave device should signal logic zero, if the data transmission has been corrupted during a read application. Further, the slave device sets the acknowledge bit, since it is the only device, that knows if an error has occurred, e.g. that the parity bit is wrong or a bus error has occurred. If no slave device is connected to the bus, a logic zero will be returned from the bus, by nature of the bus signalling scheme indicating a problem to the master.

When a data write command is issued, the X and Y command words (or registers) as shown in FIGS. 12a and 12b respectively, are transferred to the single bus.

The purpose of the X15 bit is to delay a write operation, if a slave device has an important status message to send or has transmitted an interrupt request. This is done by activating the X15 bit. If no slave device has activated this bit ('1' means activate) or if the IRQ mask is disabled, the data write command may proceed. If a delay is activated, the delay is treated in a similar manner as disclosed above with respect to the data read command.

The start of a data write command operation is signalled by register bits X14:X13="00". Y14 is defined such that a slave device may not force a data read or write command with control being provided by the master device. Furthermore, a slave device may not force a data write command when a data read command has been chosen. However, a slave device can (by error or deliberately) change a read or write operation to a ping or a write command to a read command. This should be considered a bus conflict. If the X14 bit is set to a "0", no slave device is allowed to answer with IRQ information (i.e. this signifies a read/write register operation).

The slave device should acknowledge to the master device that it has read and accepted the message at the end of a data write command. The slave device addressed by the master sets this bit to logic one to indicate that there is no parity error and it has accepted the data. The slave device that responds must be locked on to the single wire bus and must have the same address as the device the master is intending to write to. If a bus error has occurred and is detected by the master device, the master device should set the bus error bit active and try the data write command again.

When data is written to or from the slave device, eleven bits are used for addressing while four bits are used to select the specific slave device and seven address bits are reserved to select which register within the slave device that is being written, other address and register spaces could also be used. The last two bits of the X word are used for register reading or writing commands.

The last control word (Y) is used to communicate data between the master device and the slave device, or devices. In one embodiment, this data may be data that is to be written to or read from a slave device register (when no interrupt has been signalled). In another embodiment, this data may be the polling of an interrupt status from a slave device to determine which slave device has set the interrupt request. The length of the data is 16 bits which includes the last two bits of the X register. The last two bits of the Y registers are used for data integrity. Other data lengths may be used in other implementations.

Therefore, if there was no interrupt set in the X15 bit, the Y word, or Y control word, may be polled to determine information, as listed above. If an interrupt was signalled in the X15 bit and the associated interrupt mask bit was enabled, the master device pots the slave device using a ping operation. Here, the X and Y words are used to determine which slave device signalled the interrupt. This is disclosed in more detail below with respect to the status levels of the slave devices. In the X and Y words, certain registers are designated for slave devices so that the master device can quickly determine the status level for a specific slave device. A schematic diagram of part of a Y word is shown in FIG. 4d.

In order to signify that it wishes to communicate with the master device, as disclosed above, the slave device can generate an interrupt, typically during a ping operation or activate X15 of the X word during any time frame. The slave device can then send an interrupt request (IRQ) to the master device during a ping operation using slave address zero since this address is allocated to non-assigned slave devices, or baseband chip, via the single wire bus such as schematically shown in FIG. 4d which indicates the status for the five slave devices connected to single wire bus. Although only five slaves are shown, any number of slaves may be connected to the bus.

The slave device may have four status levels via their two bits, namely "00", "01", "10" and "11". "00" typically represents that the slave device is not locked on to the single wire bus. "01" signals that the slave device has locked onto the bus and this status may be used to detect when, and if, the slave device has disconnected from the bus. "10" signals that the slave is locked onto the bus but wishes to get the attention of the master device. This slave status level will also delay a read or write operation if the IRQ mask is active. A "11" signals that the slave device has an emergency situation that needs to be handled immediately, such as, but not limited to, the temperature of the device is too hot or there is a critical undervoltage or overvoltage. This status level will delay a read or write operation, if the IRQ mask is active. Therefore when an interrupt is sensed, the master device polls the Y word to determine which slave devices require attention. In the example of FIG. 4d, slave device 4 has a status level of "10" while slave device 5 has a status level of "11".

With respect to the ping operation, the values stored in the X11:X0 & Y15:Y0 registers of the X and Y words updates the status register. The highest value which is read from a slave device is compared to the slave status register and the register value is updated if the value being read is higher than the current slave status register value. In this manner, the slave device requiring the most attention receives immediate attention. When the slave status register is read, its value is not cleared by overwriting during a subsequent ping operation. In other words, the status level of slave 5 will be determined to require immediate attention and its status level written to the status register. After the ping operation has been completed then the status slave register will be updated to reflect the updated register values.

Figure 4E:
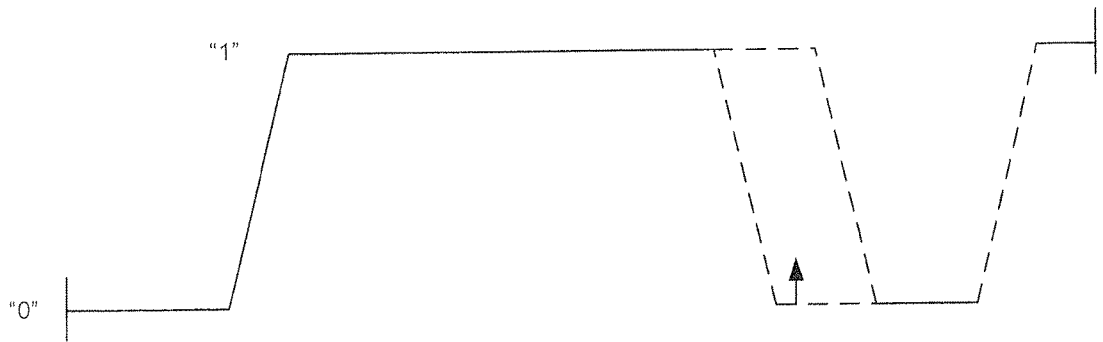
FIGS. 4e to 4g are schematics of example clock signals.
Figure 4F:
Figure 4G:
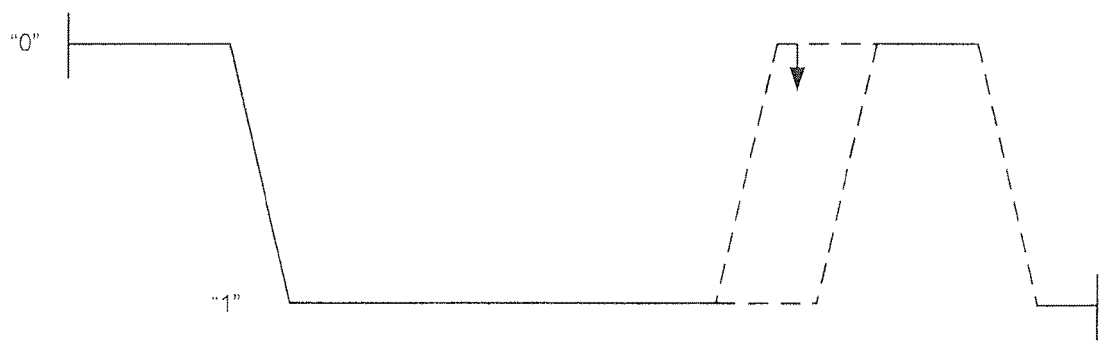

FIGS. 4e to 4g show other clock signal options or other communication protocols or how to transmit logic highs and logic lows over the bus. In FIG. 4e, the clock signal is initially pulled high (as in FIG. 4a), however, this represents a logic "1" signal such that if either the master device or one of the slave devices wishes to transmit a logic "0" during the data portion of the clock cycle, the clock cycle must be pulled down. In order to transmit a logic "1" signal, the clock signal is left unchanged until closer to the end of the clock cycle (after the bus has been sampled).

In FIG. 4f, the clock signal is initially pulled low in order to indicate the leading edge of the clock signal. In this embodiment, in order for one of the master device or one of the slave devices to signal a logic "1" during the data portion of the clock cycle, the device is required to pull the clock signal high. If the master device or one of the slave devices wishes to transmit a logic "0", the clock signal is left untouched until closer to the end of the clock cycle (after the bus has been sampled).

In FIG. 4g, the clock signal is initially pulled low in order to indicate the leading edge of the clock signal. In this embodiment, in order for one of the master device or one of the slave devices to signal a logic "0" during the data portion of the clock cycle, the device is required to pull the clock signal high. If the master device or one of the slave devices wishes to transmit a logic "1", the clock signal is left untouched until closer to the end of the clock cycle (after the bus has been sampled).

When slave devices lock onto the bus, the master device communicates with the slave devices to retrieve their address. Initially, all slave devices start off with an address of zero and therefore, if there are three (3) slave devices attempting to lock on to the bus, each one is initially assigned the value of zero. However, as will be understood, each of these devices will have an internal identification, or a unique name associated with the slave device. Typically, the unique name of the slave devices is 32 bits or more.

After the issuance of a PING command by the master device, if a slave device wishes to lock onto the bus, the end of the X word is populated with the entries 01 (indicating the presence of at least one slave device wishing to lock onto the bus). Once this is recognized by the master device, the master device performs a read of the name of the device or devices which have attempted to connect to the bus in order to assign an address to the connected slave device. As will be understood, if no slave devices are currently connected to the bus, the master device continues to complete the frame and then issues a further ping in the next frame cycle.

If at least one slave device is present, the master device reads the first bit of the unique name of all the slave devices looking to be assigned a unique address. The first bit of the unique name for each slave device is then reviewed. If they are all the same i.e. all "1" or all "0", the master device proceeds to, or pots, the next bit of the slave device names. If there is a combination of "0" and "1"s, then the master device continues only with the unique names which have a "1" as it will determine the bus value due to the dynamic nature of the bus. Thereby the master device will review the unique names in an "alphabetical order", where the slave device with the higher numerical name value is assigned a slave address before a slave device with a lower numerical name value. The numerical value of the slave device name is determined from a sorting based on a binary search, with the values being read as binary numbers. If there is only a single "1" value, then the master device assigns the slave device associated with this unique name as the first device and assigns it a unique slave value 1-13 and then proceeds to return to bus communication where it will encounter another 01 in the X word during the subsequent frame and therefore assigns a slave device address that is different from the first slave device to the next slave device in a similar manner. The determination of which slave device is to be assigned a slave address 1-13 continues until there are no more unassigned slave devices attached to the bus. As each slave device has a unique name, there will not be any situation where the master device does not know which slave device to associate with the current device address. In subsequent read and writes to slaves devices, the assigned slave addresses 1-13 will be used to identify these devices. If a slave device enters a hardware error condition and is reset, the slave address is set to the default value of zero.

Figure 9:
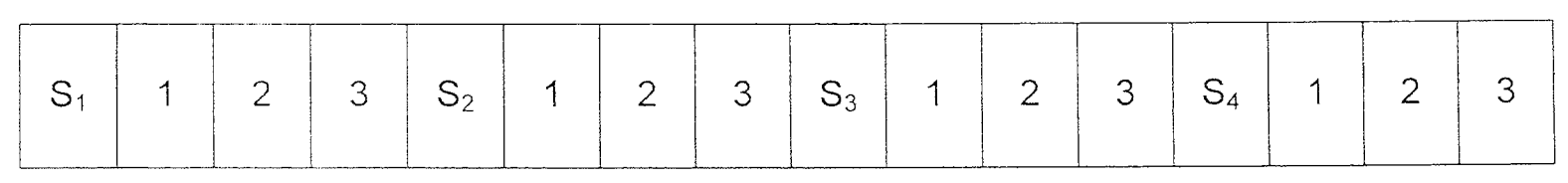

In an alternative embodiment, the control words can be sent bit by bit in order to reduce the latency that is experienced. A schematic of how the sync word may be transmitted is shown in FIG. 9. In this example, only the first four letters of the sync word are shown. In order for a slave device to lock on to the bus, it checks every $N^{th}$ bit for the sync word in this mode. In the figure, every $4^{th}$ bit is used. The other control words, X and Y, may be transmitted in a similar manner. By interlacing the sync, X and Y words with audio data content, it is possible to decrease the latency experienced for the data words, since the control words are limited to a delay of a single bit. In this mode, the slave device needs to search for the synchronization symbols with some spacing between these. In order to reduce the complexity of the search engine of the slave device, a limited number of variable spacing would typically be used, e.g. a spacing of 4 or 8 bits between each synchronization symbol. In order to reduce the search time, the control symbols would typically be repeated without any extra spacing in between. This would allow for the transmission of three and seven bitstreams simultaneously with control, when using these two selected spacings between the control bits.

As can be seen, data may be transmitted over the audio or data channels (listed as 1, 2 and 3) between sync word transmissions. As will be understood, any number of audio data channels may be used, up to a limit of 4*255 or 1020 channels between the control words.

In the following Figures, schematics of various registers for use within the slave or master devices for communicating over the bus are shown.

Turning to FIG. 8, a schematic diagram of a status register is shown. In operation, the status register provides status information from the bus and control IRQs and is controlled by read and write operations by the master or slave devices. The status register includes 8 bits which are designated B0 to B7. As will be understood, the default value of the status register after it is reset is "00000000". This assists in controlling the data communication between the master and the slave device.

Each of the bits within the status register can be read and used by the master controller. Bit B0 represents the FRAME DONE bit, Bit B1 represents the RD bit, Bit B2 represents the WR bit, Bit B3 represents the ATTACHMENT bit, Bit B4 represents the STATUS0 bit, Bit B5 represents the STATUS1 bit, Bit B6 represents the IO ERROR bit, and Bit B7 represents the BUS ERROR bit.

More specifically, the bus error bit (B7) signifies an illegal bus operation has occurred and is active high. This condition can be detected if the value on the bus is different than it should be during a master bus write operation (e.g. a slave is conflicting with the sync pattern). Once an illegal bus operation has been detected, it will remain set until this register has been read. An interrupt will be generated if illegal bus operation is observed and the corresponding IRQ mask bit is enabled (i.e. set high).

The IO error bit (B6) signifies an error during a read/write operation. It will be set if a slave device does not acknowledge a read/write command (i.e. the acknowledge bit Y0 in a read/write command is not activated/"1"). It is reset upon reading the status word. This bit is calculated as the combination of the WR and RD bit, see description of these.

The Status1 and Status0 bits give the highest status level read from any device attached to the bus. If any slave has a status level higher than indicated by these two bits, they will be updated to this new value during the next ping operation. The bits will continue to be updated to any higher status level read, until this register is read. A read of the status register will not clear this field but it will be updated to the highest status level read during the next ping operation. It is updated during every ping operation and power-on reset and thus always valid. As an example, the register value is "00" after reset and "01" after a device has been attached to the bus. Then assume a device needs urgent attention and signal "11" during a ping frame. The status register is then updated to this value. After reading the status register, the value is still "11". Assume during the next frame that the highest device level is now "10". At the end of the ping operation, the status register will be updated to this new value ("10"). This is done so that errors are first cleared when the slave device confirms this. If the interrupt mask has been enabled and an interrupt has been generated as a result of a slave requesting attention, the IRQ line will be cleared upon reading the status register. A new interrupt will be generated during next ping operation, if the slave still requests attention and the interrupt mask bit is set. During normal operation, a read from this field will return "01". I.e. one or more devices are attached to bus and there is no requirement for special service. This field can both be used to determine if any devices are attached to the bus or distinguish between devices requiring attention with low (status level "10") or high priority (status level "11"). If no devices are attached to the bus, it will return "00".

The Attachment bit (B3) is active high and will indicate if a device has disconnected or connected to the bus since last ping operation. The value can be found by comparing the device status from X and Y words during a ping operation to previous values. If the status for any device has changed from ("01","10","11") to "00" (i.e. a device has disconnected from the bus) the signal will go high. If the status has changed from "00" to {"01","10","11"} (i.e. a device has attached to the bus) the signal will go high. The attachment bit will stay high ("1") after being set until the status register has been read at which moment it is cleared. In any other case, the signal will stay low. This will indicate a change in attachment status for any device since last ping operation. A comparison is being made during every ping operation. By enabling the corresponding IRQ mask bit, this can result in an IRQ (pulling external SPARK IRQ line low) being generated as a result of a device is being attached or detached from the bus. The default value of this bit after reset is "0".

The WR Bit (B2) signifies a pending write operation and is active high. A register write operation will start by the I²C bus first writing to the data register and then to the address register. After the most significant word of the address register has been updated, the ACT_WR bit will go high and an attempt of performing a write register operation will start in the next frame. Unless delayed by a device interrupt, the writing will proceed otherwise it will be delayed to the next frame and again attempted. After the write operation is complete, this bit will be reset again immediately after the last bit of the Y word. If the slave does not acknowledge the write operation the ERR_WR bit will be set, but the ACT_WR will still go low. When the ACT_WR bit is high, a new read/write operation should not be initiated until it has returned to low.

The RD bit (B1) signifies a pending read operation and is active high. A register read operation will start by the I²C bus writing to the address register. After the most significant word of the address register has been updated, the ACT_RD bit will go high and an attempt of performing a read register operation will start in next frame. Unless delayed by a device interrupt, the read will proceed otherwise it will be delayed to next frame and again attempted. After the read operation is complete, this bit will be reset again immediately after the last bit of the Y word. If the slave does not acknowledge the read operation the ERR_RD bit will be set, but the ACT_RD will still go low. When the ACT_RD bit is high, a new read/write operation should not be initiated until it has returned to low.

The Frame Done bit (B0) signifies a frame has been completed and is active high. It is set at the last bit of a frame. This may be used to synchronize operations with the basic timing of the bus. This bit is still valid when a device is being charged and no communication is active, i.e. the frame counter is always running internally. It will continue to be set until the status register has been read. It can be used to tell if a ping operation has been completed or for basic timing, e.g. to count a certain number of frames before starting communication to ensure all devices have been charged. When the corresponding IRQ mask bit is enabled, an interrupt will be generated at the end of every frame.

Turning to FIG. 7, a schematic diagram of an IRQ Mask register is shown. In operation, the Mask register provides information relating to any errors or events which may have arisen during operation of the bus system. The Mask register includes 8 bits which are designated B0 to B7.

Each of the bits within the status register are read by or written to by the master or slave devices. Bit B0 represents the FRAME DONE bit, Bit B1 represents the RD bit, Bit B2 represents the WR bit, Bit B3 represents the ATTACHMENT bit, Bit B4 represents the ATTENTION bit, Bit B5 represents the X15 DELAY bit, Bit B6 represents the IO ERROR bit, and Bit B7 represents the BUS ERROR bit.

More specifically, the Bus Error Bit (B7) is used to enable or disable I²C interrupts. When set to high, it will enable an interrupt based on an active bus error bit in the status register. The interrupt itself is signalled by a separate active low level output line and cleared when reading the status register.

The IO Error Bit (B6) is used to enable or disable I²C interrupts. When set to high, it will enable an interrupt based on an active IO error bit in the status register (i.e. the acknowledge bit Y0 in a read/write command is not set). The interrupt is signalled by an active low level output line and cleared when reading the status register.

The X15 DELAY bit (B5) is used to enable or disable the delay of read and write operations when a slave device requests attention. When set to high, it will enable an X15 delay operation based on the value read from the bus during the X15 time slot. A slave will activate the X15 bit to signal a need for attention when the slave device status is "10" or "11" i.e. slave devices should copy the MSB of their status register during the X15 time slot. If the current operation is a read or write operation, it will be delayed until next frame and be replaced by a ping operation. At the start of the next frame, a read or write operation will be reattempted. A ping operation will proceed unaltered irrespectively of the value of the X15 bit. By enabling the X15 DELAY bit we will have a guaranteed latency of at most one frame if any device should require attention. Data traffic outside the command words can still continue while reading device status. If the IRQ mask X15 bit is inactive (low) any read or write transaction will proceed irrespectively of the value of the X15 bit. The master should clear this bit in software when an IRQ occurs to avoid blocking the reading or writing of slave registers.

The ATTENTION bit (B4) is used to enable or disable I²C interrupts based on a slave device attention request during a ping operation. When set to high, it will enable an interrupt based on a slave status level of "10" or "11". In other words, when enabling this IRQ mask bit, the master will generate an interrupt whenever a slave device requests for attention. The interrupt is signalled by an active low level output line and cleared when reading the status register. If the slave device is still requesting for attention and the attention bit continues to be enabled during next ping operation, a new interrupt will be generated. The master should clear this bit in software when an IRQ occurs to avoid multiple interrupts being generated.

The ATTACHMENT bit (B3) is used to enable or disable I²C interrupts. When set to high, it will enable an interrupt based on a change in the status register. The interrupt is signalled by an active low level output line. The interrupt is generated whenever the STA1:STA0 field changes value due to attachment or removal of a slave device to the bus. This can happen, if a slave device changes value and this value has been read by a PING operation. If a device status change and the IRQ mask device status bit are enabled, an interrupt is generated. The interrupt is cleared when reading the status register. If the status value read indicated the need for master intervention, the normal operation for a master controller would be to read back the device status values from the slave status register to find the source of the interrupt. After this has been completed, any necessary action can be carried out by writing register control commands to the slave device in question.

The WR Bit (B2) is used to enable or disable I²C interrupts after write is complete. When set to high, it will enable an interrupt based on the completion of an active write operation. The interrupt is signalled by an active low level output line. The interrupt is cleared when reading the status register. The source of the interrupt may be detected by activating a separate bit or by setting both the ACT_RD and ACT_WR register bits active at the same time to indicate the completion of an IO operation.

The RD Bit (B1) is used to enable or disable I²C interrupts after read is complete. When set to high, it will enable an interrupt based on the completion of an active read operation. The interrupt is signalled by an active low level output line. The interrupt is cleared when reading the status register.

Finally, the FRAME DONE bit (B0) is used to enable or disable I²C interrupts based on the completion of a frame. When set to high, it will enable an interrupt based on the completion of the internal frame counter. The interrupt is signalled by an active low level output line and cleared upon reading the status register. The internal frame counter in the master should still be running during charge mode.

One advantage of the present disclosure is that the bus is robust against multiple sources signalling at the same time and does is an improvement over time-constrained implementation problems as when using open-collector and open-drain type, where the signalling speed is a compromise between power consumption and noise immunity.

The above-described embodiments are intended to be examples only. Those of skill in the art can effect alterations, modifications and variations to the particular embodiments without departing from the scope of this application.

What is claimed is:

1. A single wire bus system comprising:
   a single wire bus;
   a master device coupled to the single wire bus;
   at least one slave device coupled to the single wire bus;
   a communication protocol implemented over the single wire bus for communication between the master device and the at least one slave device;
   wherein the communication protocol employs the use of a continuous clock signal and bi-directional data transmission within each clock cycle for communication on the single wire bus;
   wherein the at least one slave device is configured to signal on the single wire bus its status from among a first status level indicating that the at least one slave device is not locked on to the single wire bus, a second status level indicating that the at least one slave device is locked onto the single wire bus, a third status level indicating that the at least one slave is locked onto the single wire bus and requests attention from the master device, and a fourth status level indicating that the at least one slave device has an emergency situation and requests attention from the master device;
   wherein fixed-length frames of data are transmitted on the single wire bus and each frame comprises command words used for controlling devices attached to the single wire bus and a synchronization word that is used to allow the at least one slave device to lock on for communication with the master device, the synchronization word comprising a constant value and a pseudorandom portion.

2. The single wire bus system of claim 1, wherein a frame structure of the frames has a bit interleaved processing type structure in which the command words and the synchronization word are sent bit by bit, and the command words and the synchronization word are interlaced with audio data content comprising at least one bitstream.

3. A method for communication between a master device and at least one slave device, wherein the method comprises:
   coupling the master device to a single wire bus;
   coupling the at least one slave device to the single wire bus; and
   implementing a synchronous communication protocol over the single wire bus for communication between the master device and the at least one slave device;
   wherein the communication protocol employs the use of a continuous clock signal and bi-directional data transmission within each clock cycle for communication on the single wire bus;
   wherein the at least one slave device is configured to signal on the single wire bus its status from among a first status level indicating that the at least one slave device is not locked on to the single wire bus, a second status level indicating that the at least one slave device is locked onto the bus, a third status level indicating that the at least one slave is locked onto the bus and requests attention from the master device, and a fourth status level indicating that the at least one slave device has an emergency situation and requests attention from the master device;
   wherein fixed-length frames of data are transmitted on the single wire bus and each frame comprises command words used for controlling devices attached to the single wire bus and a synchronization word that is used to allow the at least one slave device to lock on for communication with the master device, the synchronization word comprising a constant value and a pseudorandom portion.

4. The method of claim 3, wherein a frame structure of the frames has a bit interleaved processing type structure in which the command words and the synchronization word are sent bit by bit, and the command words and the synchronization word are interlaced with audio data content comprising at least one bitstream.

5. The single wire bus system of claim 1, wherein the at least one slave device is configured to signal an interrupt by setting a specific bit of one of the command words.

6. The single wire bus system of claim 5, wherein the interrupt is used to delay a read operation or to delay a write operation.

7. The single wire bus system of claim 6, wherein the at least one slave device is to copy contents of the most significant bit of its status register onto the single wire bus during the delay.

8. The single wire bus system of claim 5, wherein the master device is configured to detect which slave device signaled the interrupt from another one of the command words.

9. The single wire bus system of claim 2, wherein the at least one slave device is configured to signal an interrupt by setting a specific bit of one of the command words.

10. The single wire bus system of claim 9, wherein the interrupt is used to delay a read operation or to delay a write operation.

11. The single wire bus system of claim 10, wherein the at least one slave device is to copy contents of the most significant bit of its status register onto the single wire bus during the delay.

12. The single wire bus system of claim 9, wherein the master device is configured to detect which slave device signaled the interrupt from another one of the command words.

13. The method of claim 3, further comprising the at least one slave device signaling an interrupt by setting a specific bit of one of the command words.

14. The method of claim 13, wherein the interrupt is used to delay a read operation or to delay a write operation.

15. The method of claim 14, further comprising the at least one slave device copying contents of the most significant bit of its status register onto the single wire bus during the delay.

16. The method of claim 13, further comprising the master device detecting which slave device signaled the interrupt from another one of the command words.

* * * * *